Oct. 6, 1959

E. E. LINDSEY 2,907,267

COOKER

Filed Aug. 14, 1952

INVENTOR.
ERNEST E. LINDSEY
BY George R. Bliss
Attorney

Oct. 6, 1959
E. E. LINDSEY
2,907,267
COOKER
Filed Aug. 14, 1952
2 Sheets-Sheet 2
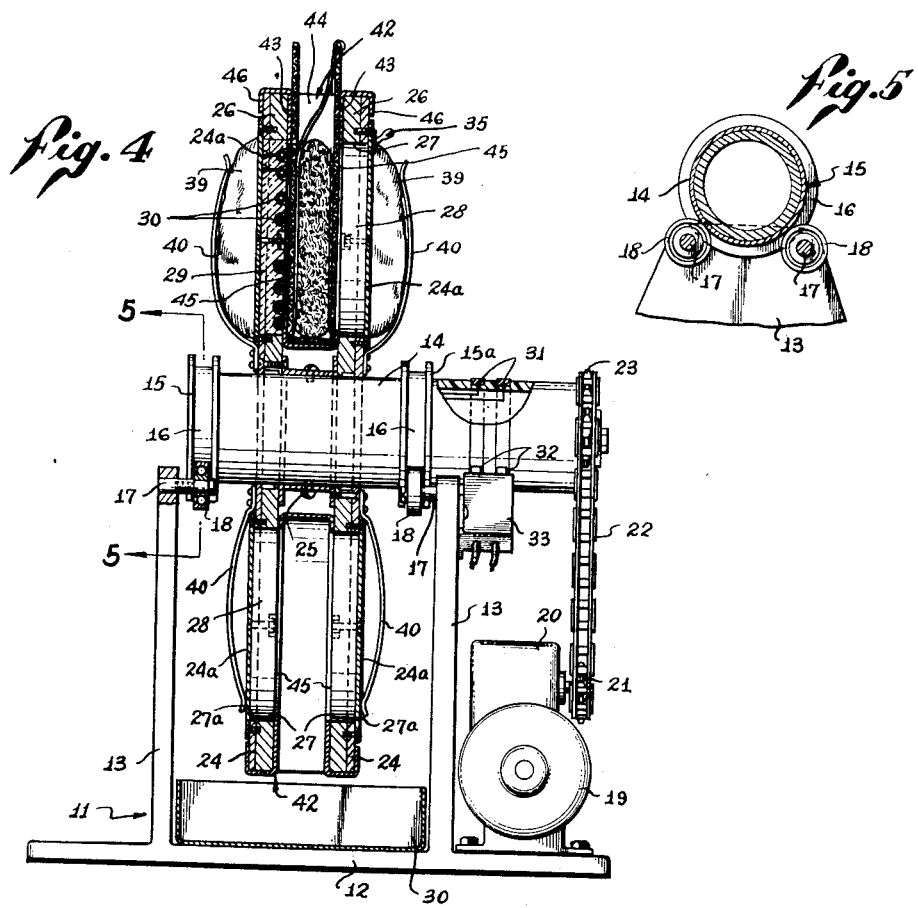
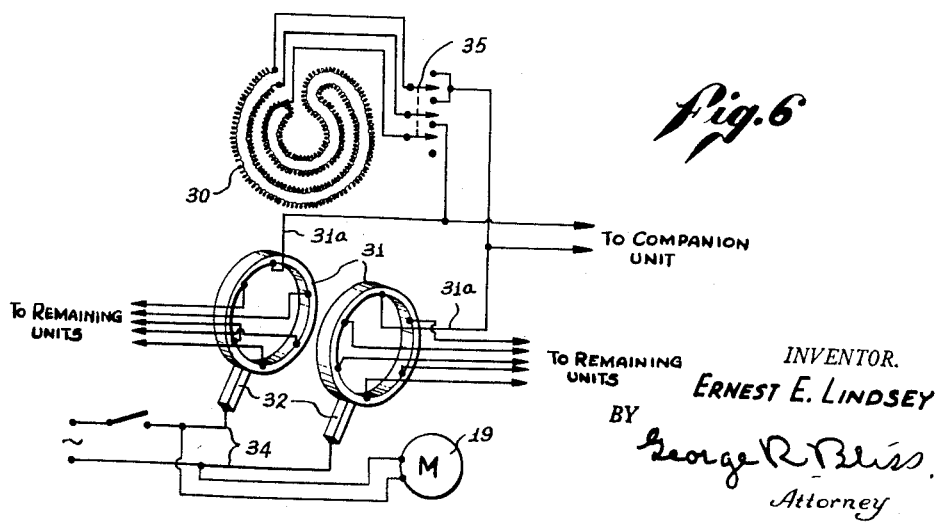
INVENTOR.
ERNEST E. LINDSEY
BY
George R. Bliss
Attorney

United States Patent Office 2,907,267
Patented Oct. 6, 1959

2,907,267

COOKER

Ernest E. Lindsey, Los Angeles, Calif.

Application August 14, 1952, Serial No. 304,281

11 Claims. (Cl. 99—339)

This invention relates to cookers and particularly to sandwich cookers. While a cooker of this invention may be used to prepare a variety of cooked articles, it is particularly designed for the preparation of ground meat sandwiches, commonly termed "hamburgers."

In recent years the practice of selling food articles from small establishments located in limited quarters in department stores, food stores and in front of such stores or at places of amusement and public parks has greatly increased. Although a cooker of this invention has many advantages in its use in restaurants, homes, or other places where food is prepared, it is particularly well adapted to use in the situations and under the conditions just mentioned. Cookers to meet the requirements of such locations and such kind of use must be compact, occupy a limited floor space, must be simple and easy of operation so that a person of average intelligence and experience may successfully operate one, must do its work within sight of the customer and compel his attention by its attractive appearance and the movement of its parts must be clean and sanitary, inexpensive to operate and subject to a minimum of stoppage due to breakdown or other operative causes.

Furthermore, since the demand for the product of the cooker varies with the time of day and with the varying number of passing customers and their changing whims, and from various other causes, the cooker must preferably be adjustable as to its rate of production. Preferably it should also be so designed that articles which have been cooked and are ready to be served may be kept warm and invitingly fresh for a reasonable period of time.

As will be apparent from a reading of the following description of the invention, the machine broils the meat and at the same time toasts the slices of bread or buns between which the meat is to be placed, the broiling and toasting operation being initiated upon a succession of pieces of meat and their bread covers one after the other, the first sandwich being properly cooked and ready for removal from the machine and replacement with the raw materials for another sandwich after the machine has completed one cycle of movement. The machine is so designed that the meat is broiled on both sides by heat which is largely of the radiant type rather than of the convection or conduction type. Radiant heat penetrates all parts of the meat and thoroughly cooks the innermost particles of the meat patty as well as the particles on or near the surface.

The machine consists essentially of a vertically disposed rotating wheel structure with provision for placement of the sandwich materials for a number of sandwiches one after another on the wheel, preferably at the top of the wheel, and removal of the fully prepared sandwich from the wheel when the sandwich reaches the same position at which the materials for the sandwich were initially placed on the machine.

In addition to the manifest advantages of visibility, simplicity, low operating cost, and adaptability to the installation conditions, several minor advantages will be noted as the construction and operation of the machine become understood. Excess grease and liquids from the meat are accumulated during the cooking operation and are discharged before the cooking operation is completed into a catch pan which may be periodically removed and emptied. Due to the slow planetary rotation of the meat patties through one revolution as the cooking wheel also makes one revolution, the meat juices as they form and are acted upon by gravity during the revolution of the cooking wheel, move in all directions through the meat patties and are retained therein improving their flavor and consistency.

Figure 4 is a sectional elevation as taken along the line 4—4 of Figure 1;

Figure 5 is a sectional view as taken along the line 5—5 of Figure 4; and

Figure 6 is a wiring diagram illustrating an electrical system such as might be used in the practice of my invention.

Figure 1:
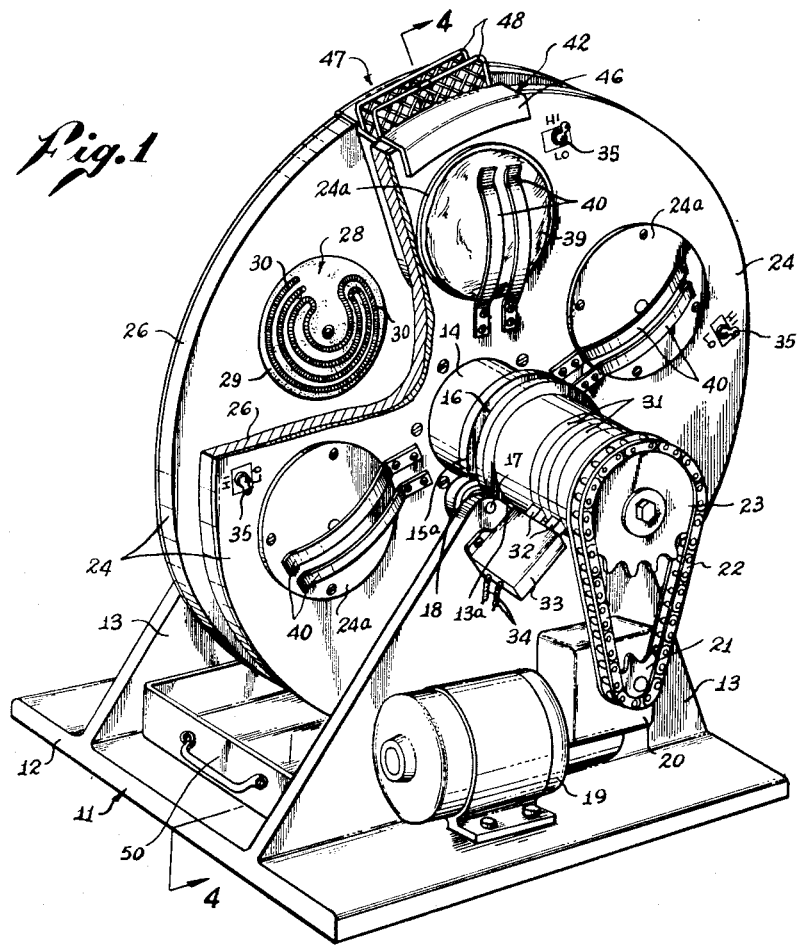
Figure 1 is a perspective view of my cooking device with a portion broken away to show a portion more clearly.
Figure 2:
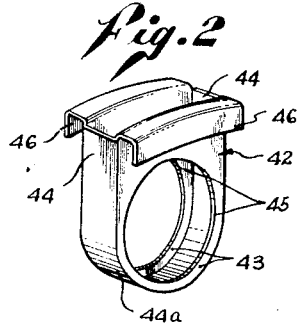
Figure 2 is a perspective view of one of the receptacles for catching grease drippings.
Figure 3:
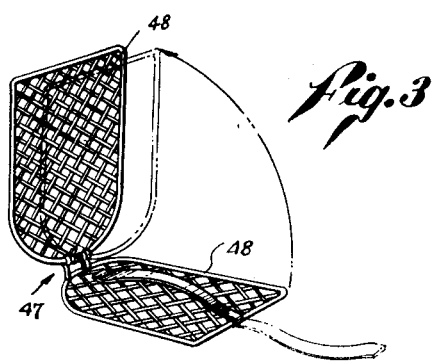
Figure 3 is a perspective view of one of the hinged meat receiving units.

The sandwich cooker described and shown herein has a supporting stand 11 consisting of a base plate 12 and a pair of parallel upstanding triangular plates 13, preferably formed integrally with the base plate 12.

A hollow shaft 14 is rotatably mounted in two arcuate rests formed in the upper ends of the plates 13. At its left end as seen in Figure 4, the shaft has secured thereon an annular flanged track 15. A similar track 15a is secured to the shaft near its right end. A pair of pins 17 are secured to each of the plates 13, one of these pins extending inwardly and parallel to the shaft 14 at each end of each of the arcuate rests 13a formed in the upper end of the plate 13. A ball bearing wheel 18 is rotatably mounted upon each of the four pins 17. Each wheel 18 is so spaced along its pin that it projects into the groove 16 of the associated track. The left-hand pair of wheels 18 rotatably support the left-hand end of the shaft 14, and the right-hand pair of wheels 18 similarly support the right-hand end of the shaft 14.

The hollow shaft 14 is very slowly turned upon the bearing support afforded by the wheels 18, by an electric motor 19 mounted upon the base plate 12 outside of the outer face of the right-hand supporting plate 13. Motor 19 drives the shaft 14 through reduction gearing 20, sprocket pinion 21, sprocket chain 22, and sprocket 23 which is fixedly mounted on the shaft 14.

A pair of spaced-apart, centrally apertured discs, wheels or circular plates 24 of asbestos cement, are fixedly mounted on the shaft 14 between the supporting plates 13. These discs 24 are faced on their sides with relatively thick discs 26. The discs 26 are made of a relatively soft asbestos composition comprising asbestos fibre, diatomaceous sand and an inorganic binder. This material has excellent heat resistant properties and may be readily cut and formed as desired. It should preferably, however, be supported by some more rigid material. This support is provided in the asbestos cement discs. These discs of Portland cement and asbestos fibre are of rigid character, difficult to cut or otherwise deform, are of substantial tensile strength and inflexible.

The rings 26 are held in position each against its associated disc in any suitable manner. As shown in the drawing, one of the flanges of a small metal channel shaped ring 25 is bolted to its corresponding disc 24 with the ring 26 clamped between the disc 24 and the flange of the ring 25. The central axially extending web of the ring 25 lies against the periphery of the shaft 14 and this web is bolted or otherwise secured to the shaft 14 with the object of causing the entire assembly of rings to rotate with the shaft and to be fixed against axial displacement along the shaft.

Radially intermediate the shaft 14 and the periphery of each ring assembly, a plurality of circular through recesses or holes 27 are formed in the material of each ring 26. Registering holes 27a are formed in the rings 24. In each set of these recesses or openings 27 and 27a there is placed a heating element 28, consisting of a refractory base 29 and the conventional resistance coils 30. The refractory base 29 is preferably circular in shape, snugly fitting within the recesses 27 and 27a and is bolted to an aluminum disc 24a which is in turn fastened to the disc 24 and held securely in position. Any suitable number of heating elements may be mounted in an annular row in each ring assembly. As shown in the drawing, six such heating elements are provided in each ring. The heating elements in the two ring assemblies are arranged in pairs, a heating element in one ring assembly being axially aligned with a heating element in the opposite ring assembly.

The current to energize the heating coils of the elements 28 is supplied from a current source and distributed to the several heating elements in the following manner. A pair of brushes 32 mounted on a brush holder 33 bolted to the right-hand plate 13, have a sliding contact with the conductor rings 31 respectively on the shaft 14. Leads 34 from a suitable source of electric potential are connected to the brushes 32, respectively.

Each heating element 28 may comprise, in the conventional fashion, two heating coils 30, which may be connected either in series or in parallel between the brushes 32. Accordingly conductors 31a lead from the rings 31 to each of a set of switches 35, there being provided one switch 35 for each pair of opposed heating elements 28. As shown in Figure 4, which illustrates the diagram of the electrical connections of the machine, each switch 35 when thrown to one position connects one of the brushes 32 to a conductor 31a leading to a common center point of the coils 30 causing the current to flow in parallel to the outer terminal of the coils and hence by a common return to the other of the two brushes 32. Or the switch may be thrown into the other position in which one of the brushes 32 is connected to the outer end of one of the coils 30 causing the current to flow in series through the two coils and back to the other brush 32. In the former case each heating element generates a relatively higher temperature and in the latter case each heating element generates a relatively lower temperature. Or the switch may be thrown to its middle neutral position.

A pair of spring clips 40 are secured to the outside face of each disc 24 adjacent to the shaft 14, extending radially outwardly in transverse alignment with each of the heating elements 28. These spring clips 40 are bowed as shown in the drawing to conform to a sandwich bun 39, which may be slipped beneath the spring clips by raising the outer ends of the clips and allowing the clips to fall back in position upon the bun, holding it tightly against the outer face of the asbestos cement disc 24 and the aluminum plate 24a. Heat from the element 28 is readily conducted through the thin wall of the disc 24a and toasts the bun held by the clips 40 concentrically in place over the heating element 28.

A plurality of meat cups 42 are provided for use with the machine. Each meat cup has two side walls 43 and an edge wall 44 with a semicircular end portion 44a. This edge wall joins the sidewalls 43, excepting along the upper edge of the sidewalls where an opening is left for insertion of the meat holder. Each sidewall 43 is formed with a large circular opening 45, which, when the meat cup is in position, is in transverse alignment with the adjacent heating element 28. A portion of each sidewall at the upper edge thereof is bent outwardly and downwardly to form a pair of clips 46 by which the cup may be placed in position on the asbestos discs and frictionally held against displacement.

Each layer or slice of sandwich meat is placed between two open-work metal sheets 48 of a meat holder 47, shaped to fit the meat cup and hinged together at their inner edges by a hinge provided with a spring which urges the sheet 48 outwardly from each other. When the meat holder is placed in the metal cup, obviously the pressure exerted by the spring of the hinge upon the plates 48, holds the plates in contact with the sides of the meat cups and prevents outward movement of the meat holder. One of the sheets 48 is provided with a bowed spring clip which is hinged to the outer edge of the sheet. When this clip is turned down upon the meat patty and the sheets 48 are folded together and placed in the meat cup the meat patty is held securely in position by the clip. The meat cups and the meat holders are of a size and are so arranged relatively to each other and to the machine that when the meat is in the meat holder and the meat holder is in position, the meat is transversely aligned between two of the heating elements 28 and is subjected to the cooking heat therefrom.

The rotating assembly of the machine is designed and the drive is timed to make one or more complete revolutions during the interval of time required for properly toasting the buns and properly cooking the meat. Preferably the machine should be constructed and designed to make one complete revolution for this toasting and cooking operation.

As a pair of heating elements approaches the uppermost part of its travel, a pair of buns are placed in position under the clips 46 and a meat holder 47 with the meat in position in it is inserted in the meat cup. As each succeeding pair of heating elements reaches the top of the circle of travel, the associated clips and meat holder are similarly loaded. As each pair of heating elements with buns and meat in position arrives at the top of the travel of the discs after making one complete circuit of the machine, the buns and meat holder are removed, the meat placed in position between the buns, and the sandwich is completed and ready for delivery to the customer. The unloaded clips and meat cup are then reloaded for the processing of the next sandwich.

In the course of the movement of the meat cup from the top to the bottom of its circle of travel, excess grease and any other liquid which may drop to the bottom of the meat cup during the cooking operation is automatically poured into a catch pan 50 which is so placed that it catches these liquids as they move downwardly along the lower edge wall 44 as this lower edge wall passes the horizontal position and assumes a downwardly inclined position. Much of the liquid fat and meat juices will gravitate slowly through the meat patty as the machine rotates. This movement will always be vertically downward and as the meat patty has a slow planetary revolving movement these juices will move throughout the meat patty, keeping it moist and flavorful.

If it is desired to keep a sandwich hot without further cooking after the cooking operation has been properly completed, this may be done by throwing the corresponding switch 35 to the low heat position in which the heating coils 30 are connected in series, or the switch 35 may be put in neutral and the residual heat in the heating element may be used to keep the sandwich materials warm.

It is very apparent that the machine may be modified in many respects without departure from the principles of construction and operation which characterize the invention. The device shown and described herein is therefore to be considered as one embodiment of the invention and the invention is not to be considered as confined to this one embodiment but as including any and all other structures coming within the definitional scope of the appended claims.

I claim:

1. In a cooking machine, the combination of: a frame; a circular disk of rigid, hard, non-combustible material, substantially resistant to deformation by mechanical action and by heat, mounted to rotate on the frame; a second circular disk of similar but softer material secured to one face of the first disk in transverse alignment therewith, and having formed therein an annular row of through recesses; a plurality of electric heating elements mounted on said first disk and disposed in said recesses; and a spring clip holder for an article to be cooked mounted on the opposite face of the first disk in transverse alignment with each of said elements.

2. In a cooking machine for simultaneously cooking the component parts of a sandwich comprising two breadstuff slices and a layer of dissimilar foodstuff, the combination of: a pair of transversely aligned parallel spaced-apart wheels mounted to rotate in unison and made of rigid, non-combustible material, substantially resistant to deformation by heat; means for slowly rotating said wheels at a constant rate of speed; an annular row of electric heating elements mounted on each of the wheels, the elements of one wheel being in transverse alignment with the elements of the other wheel, respectively; a plurality of holders for supporting respectively the layers of dissimilar food, said holders being removably securable to and between said wheels in position to transversely align the food in each holder with and between an associated transversely aligned pair of said elements; a plurality of pairs of breadstuff slice holders, the holders of each pair being mounted on the opposite outside faces of said wheels respectively, in position to transversely align the slices placed in the holders with the associated heating elements and holders for dissimilar foodstuffs respectively; and means for slowly rotating the wheels.

3. In a food cooker: a frame; a pair of spaced-apart circular parallel first plates mounted vertically on the frame in transversely aligned position for rotation in unison with respect to the frame, said plates being made of Portland cement and asbestos fibre and being rigid, hard, non-combustible and resistant to deformation by heat; a pair of second plates made of a homogeneous mixture of asbestos fibre, diatomaceous silica and an inorganic binder and being non-combustible and relatively softer and easier to form, said second plates being secured to the inner juxtaposed faces of said first plates, respectively, there being a disk shaped void between the two second plates; an annular row of through recesses in each of said second plates, each recess in one second plate being transversely aligned with an associated recess in the other second plate; electrically energized heating elements mounted on each of the first plates and seated in the recesses, respectively, the inner end face of the heating element which is parallel to the plates, being exposed; and a plurality of meat receiving supports, each of which is attached to the rim of at least one plate and is disposed between each pair of associated elements respectively.

4. The combination defined in claim 3 and in addition thereto a spring clip means mounted on the outer face of each first plate disposed to releasably secure a piece of bread or the like against an areal portion of the outer face of the first plate transversely aligned with each heating element.

5. The combination defined in claim 2, in which the wheels rotate on a horizontal axis and in which each of the holders for the layers includes a pocket having a liquid-tight trough at its inner end adjacent the center of the revolving wheels, and the pocket is open at its outer end adjacent the periphery of the revolving wheels, and in addition thereto a liquid receiver below the wheels.

6. The combination defined in claim 5 in which the food holder also includes a pair of parallel open-work plates spring-hinged to open divergently, and shaped and sized to slide centrally inwardly of the pocket and snugly fit therewithin and be frictionally held therein through the action of said spring.

7. In a food cooker: a frame; a structure mounted on the frame to rotate on a horizontal axis; a first annular row of individual means mounted on the structure, and centered on said axis for directing radiant energy parallel to the said axis; a second annular row of individual means mounted on the structure, and centered on said axis for directing radiant energy parallel to said axis, the individual means of one row being transversely aligned with the individual means of the other row; a plurality of meat supports, each fixedly mounted on the structure and disposed between a transversely associated pair of said means; a first annular row of holders mounted on the structure and centered on said axis shaped to hold a piece of baked breadstuff; a second similar row of holders, said first and second rows of holders being in planes parallel to the planes of the two rows of individual radiant energy means, and proximately without said planes, the said holders of each row being transversely aligned with the radiant energy means of the adjacent row thereof; and means for slowly rotating the structure at a constant rate of speed.

8. In a food cooker: a frame; a structure mounted on the frame to rotate on a horizontal axis; a first annular row of individual means mounted on the structure, and centered on said axis for directing radiant energy parallel to the said axis; a second annular row of individual means mounted on the structure, and centered on said axis for directing radiant energy parallel to said axis, the individual means of one row being transversely aligned with the individual means of the other row; a plurality of food supports, each fixedly mounted on the structure and disposed between a transversely associated pair of said means; each said support having a pocket at that end thereof which is radially inward with respect to the structure, said pocket being capable of holding a small quantity of liquid and having walls which are liquid-tight with respect to radially inwardly moving liquid, said support being open ended at its radially outward end, said open end being in liquid communication with said pocket; and means for slowly rotating the structure at a constant rate of speed.

9. In a food cooker: a frame; a structure mounted on the frame to rotate on a horizontal axis; a first annular row of individual means mounted on the structure, and centered on said axis for directing radiant energy parallel to the said axis; a second annular row of individual means mounted on the structure, and centered on said axis for directing radiant energy parallel to said axis, the individual means of one row being transversely aligned with the individual means of the other row; a plurality of food supports, each mounted on the structure and disposed between a transversely associated pair of said means; a first annular row of holders mounted on the structure and centered on said axis shaped to hold a piece of baked breadstuff; a second similar row of holders, said first and second rows of holders being in planes parallel to the planes of the two rows of individual radiant energy means, and proximately without said planes, the said holders of each row being transversely aligned with the radiant energy means of the adjacent row thereof; an individual independently operable control means for each pair of said transversely alined radiant energy means; and means for slowly rotating the structure at a constant rate of speed.

10. In a cooking machine for simultaneously cooking the component parts of a sandwich, comprising at least one breadstuff slice and a layer of dissimilar foodstuff, the combination of: a frame; a circular disk mounted to rotate in a vertical plane on the frame; a plurality of heating elements mounted in an annular row on the disk; associated with each heating element, a breadstuff slice holder mounted on one vertical face of the disk, and a layer holder mounted on the other vertical face of the disk, the two holders being transversely aligned with their associated heater element, and power means for slowly rotating said disk.

11. In a cooking machine for simultaneously cooking the component parts of a sandwich comprising at least one breadstuff slice and a layer of dissimilar foodstuff, the combination of: a revolving structure mounted to revolve on a substantially horizontal axis; a plurality of heating elements mounted in an annular row on the structure; a plurality of pairs of food holders, one of each of which pairs is a slice holder, and the other of each of which pairs is a layer holder, each of the pairs of holders being secured to said structure in position to horizontally align the food placed therein with an associated one of said elements respectively in cooking relationship with said associated element, and power means for slowly relating said structure.

References Cited in the file of this patent

UNITED STATES PATENTS

| Number | Name | Date |
|---|---|---|
| 1,361,183 | Reed | Dec. 7, 1920 |
| 1,378,080 | Woodson | May 17, 1921 |
| 1,477,343 | Griffin | Dec. 11, 1923 |
| 1,507,883 | Campbell | Sept. 9, 1924 |
| 1,531,517 | Simons | Mar. 31, 1925 |
| 1,599,556 | Cook | Sept. 14, 1926 |
| 1,621,234 | Carpenter | Mar. 15, 1927 |
| 1,984,782 | Brand | Dec. 18, 1934 |
| 2,047,046 | Wade | July 7, 1936 |
| 2,400,640 | Hanson et al. | May 21, 1946 |
| 2,542,265 | Staples | Feb. 20, 1951 |
| 2,582,760 | Schoonmaker | Jan. 15, 1952 |
| 2,585,170 | Prather | Feb. 12, 1952 |
| 2,629,314 | Varady | Feb. 24, 1953 |
| 2,646,495 | Dornbush | July 21, 1953 |